Dec. 22, 1936.  A. D. EITZEN  2,064,893
OPTICAL SYSTEM
Original Filed Dec. 20, 1933    3 Sheets—Sheet 1

INVENTOR
August D. Eitzen,
BY Gustav Drews
ATTORNEY

Dec. 22, 1936.  A. D. EITZEN  2,064,893
OPTICAL SYSTEM
Original Filed Dec. 20, 1933   3 Sheets-Sheet 2
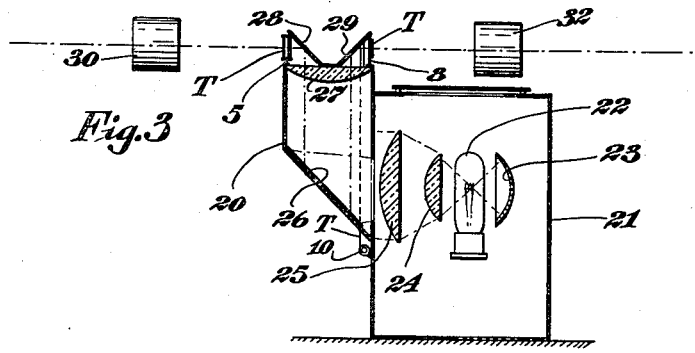
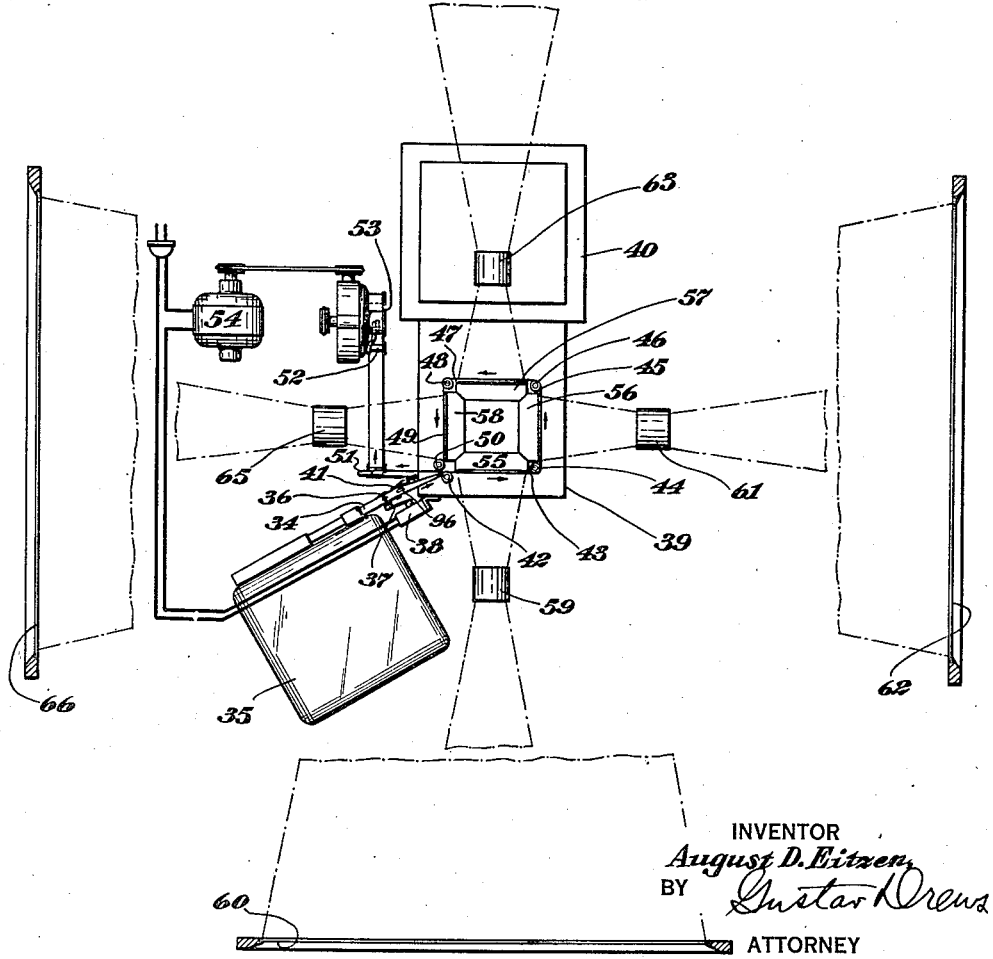
INVENTOR
August D. Eitzen
BY Gustav Drews
ATTORNEY Dec. 22, 1936.　　　A. D. EITZEN　　　2,064,893
OPTICAL SYSTEM
Original Filed Dec. 20, 1933　　3 Sheets—Sheet 3
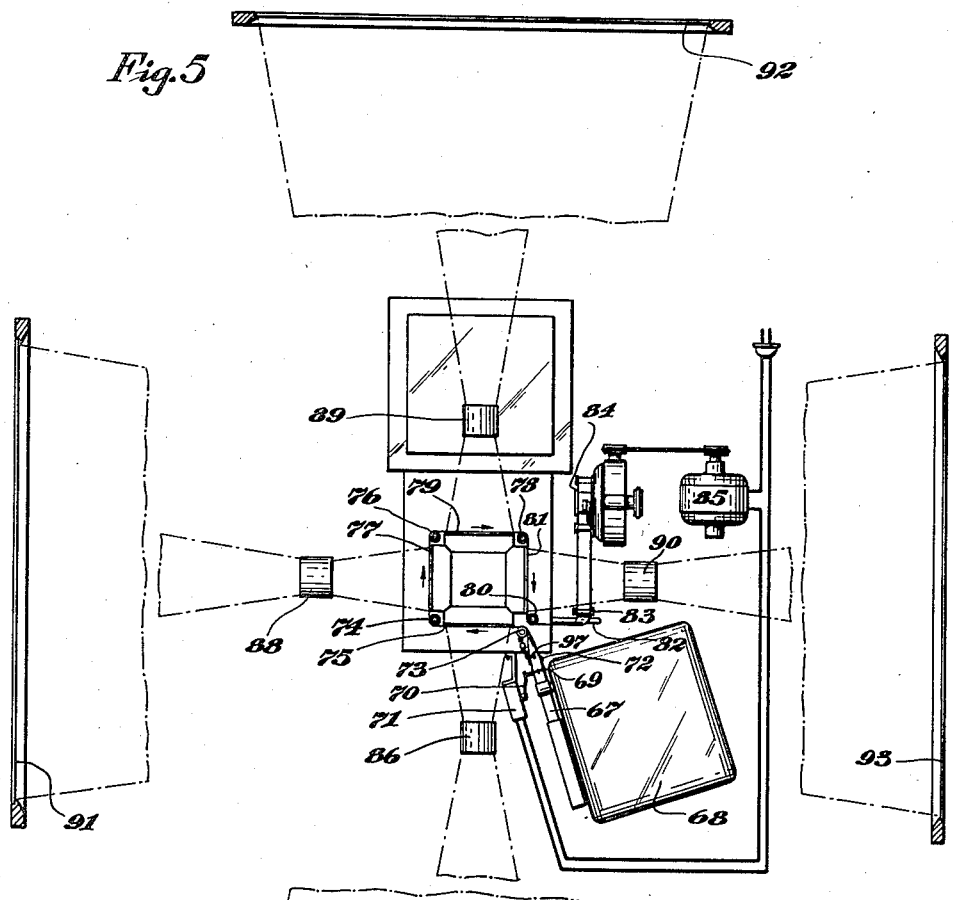
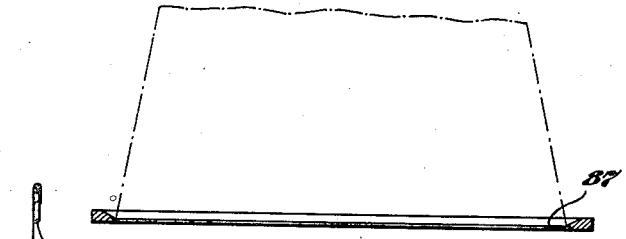
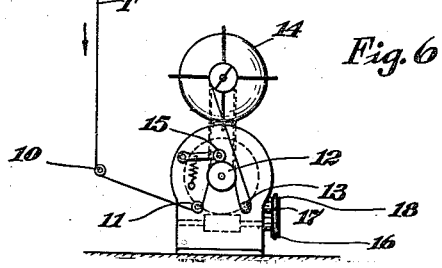
INVENTOR
August D. Eitzen,
BY Gustav Drews
ATTORNEY Patented Dec. 22, 1936

2,064,893

UNITED STATES PATENT OFFICE 2,064,893

OPTICAL SYSTEM

August D. Eitzen, Rockville Centre, N. Y., assignor to News Projection Corporation, New York, N. Y., a corporation of New York Application December 20, 1933, Serial No. 703,183
Renewed March 22, 1935

27 Claims. (Cl. 88—24)

This invention relates to optical systems in general and more especially to optical systems for stock quotation projection machines and the like.

Among the objects of the present invention, it is aimed to provide an optical system for a stock quotation projection machine having a single source of light, a plurality of light apertures in which the space between successive light apertures and therefore the distance between successive tape portions simultaneously exposed at the light apertures may be maintained at a minimum and the tape protected against excess heat.

It is still another object of the present invention to provide an improved optical system especially adapted for stock quotation projection machines and in which the tape is twisted from its normal horizontal position to move in vertical planes across a plurality of adjacent light apertures disposed in a compact lamp housing so that the space between adjacent light apertures may be reduced to a minimum and the freshly printed tape protected against drying too quickly with the resulting distortion of the projected picture.

It is still another object of the present invention to provide an improved optical system especially adapted for a stock quotation projection machine in which the tape is twisted from its common horizontal position as it is discharged by the ticker or the like to move in vertical planes across a plurality of light apertures and means are provided for dividing the light rays from a single source of light into a plurality of light beams and directing one through each of said light apertures, in which the light rays initially produced by the source of light are deflected from a horizontal direction into a vertical direction onto said beam splitting or dividing means.

These and other features, capabilities and advantages of the invention will appear from the subjoined detail description of specific embodiments thereof illustrated in the accompanying drawings in which Figure 1 is a fragmental plan view of one embodiment of the present invention;

Fig. 3 is a transverse section of the lamp housing in its relation to the objective lens units of the embodiment illustrated in Fig. 1;

Fig. 4 is a fragmental plan view of another embodiment of the present invention;

Fig. 5 is a fragmental plan view of still another embodiment of the present invention; and Fig. 6 is a section on the line 6—6 of Fig. 1.

Figure 1:
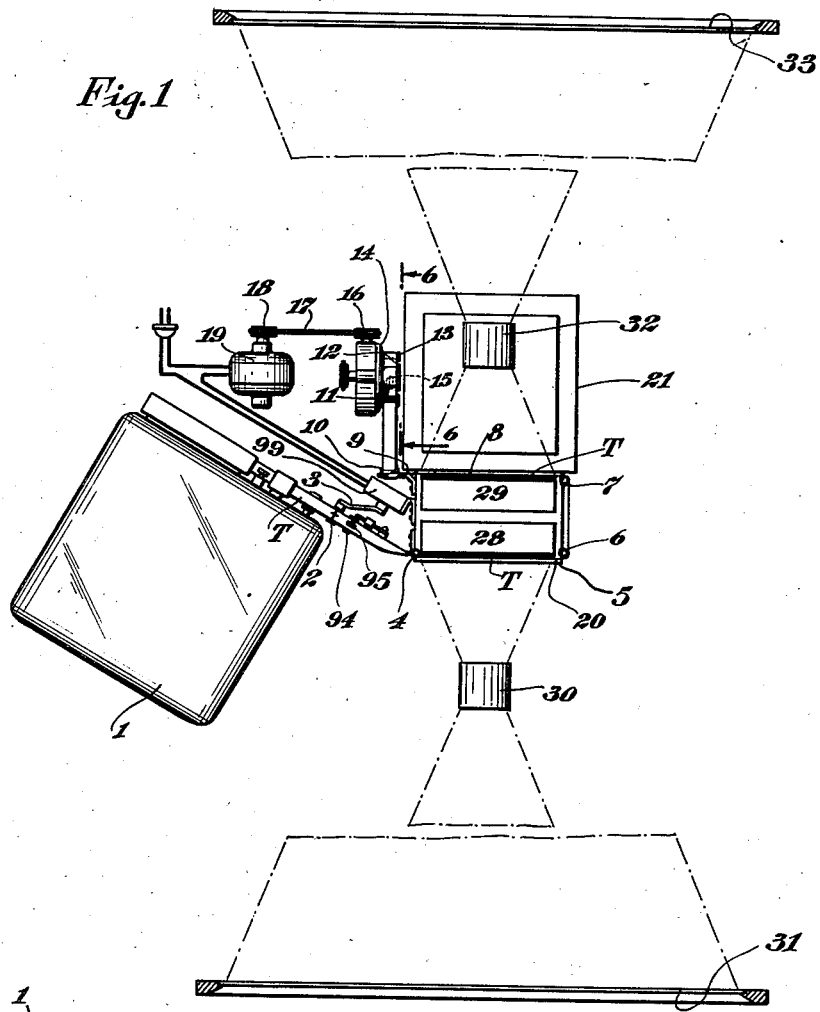
Figure 2:
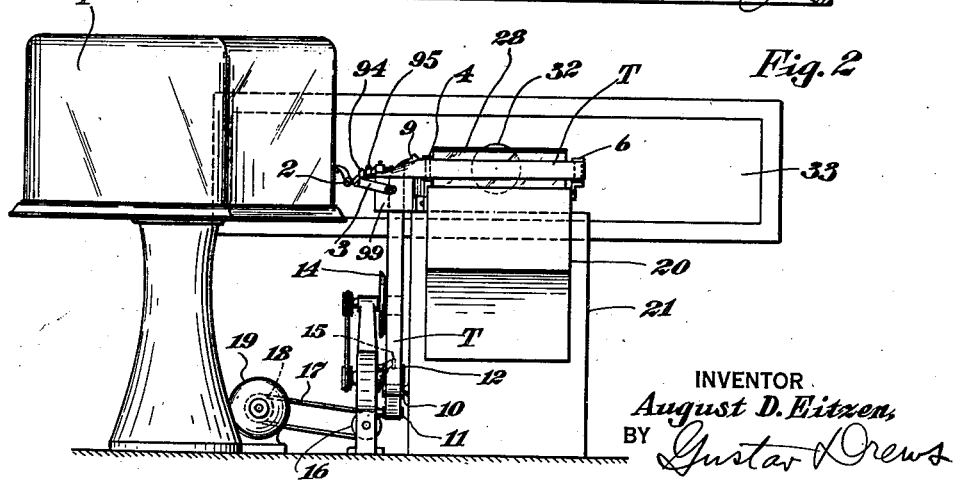
Fig. 2 is a front elevation of the embodiment illustrated in Fig. 1 omitting one of the screens and objective lens units.

The embodiment illustrated in Figs. 1, 2, 3 and 6 is limited to two light apertures, showing a ticker 1 from which the tape T is discharged and passes initially under the roller or finger 2 of the switch arm 3 and then is twisted to pass from a horizontal plane into a vertical plane first engaging the idler 4 at the entrance end of the light aperture 5 and then passing around the idler 6 to the idler 7 at the entrance end of the second light aperture 8 and finally passing helically around the forty-five degree angle plate 9 to make a ninety degree bend or change of direction with itself to move in a vertical direction downward to the idler 10, see Fig. 6.

Preferably as indicated in Fig. 1, the ticker 1 is disposed at an oblique angle to the light aperture 5 so that the direction of movement of the tape T at the ticker will form an angle of about thirty degrees to the direction of movement of the tape T at the light aperture 5.

Preferably also when it is desired to use a rear projection screen, the twist imparted to the tape T will cause the printed side to face away from the light aperture with the top edge of the tape disposed at the bottom with respect to its printed matter. After leaving the idler 10, the tape passes to the tape pulling and rewind unit, first passing under the idler 11, then over the tape pulling roller 12, then under the idler 13 and finally onto the rewind reel 14.

The pressure roller 15 is provided to maintain the tape T in frictional driving engagement with the pulling roller 12. The tape pulling roller 12 is drivingly connected to the driven sheave 16 which is connected by the belt 17 with the sheave 18 of the motor 19.

The vertically extending light apertures 5 and 8 are formed at opposite sides of the upper end of the extension 20 of the lamp housing 21. In the lamp housing 21, there is located the lamp 22 having the reflector 23 for cooperating with the lamp 22 to direct the light rays of the lamp 22 through the successive condensers 24 and 25 onto the deflector 26 from which the light rays, as a beam of light, are directed upwardly to and through the condensing lens 27 onto the deflectors 28 and 29 disposed at an angle of about forty-five degrees to the vertically extending light apertures 5 and 8.

From the foregoing, it will thus appear that the light rays initially move in a substantially horizontal direction from the lamp to the deflector 26, then move in a substantially vertical direction and after passing through the condenser 27 are split up into two subordinate beams by the mirrors or deflectors 28 and 29, one beam passing through the light aperture 5 and the other beam passing through the light aperture 8.

The subordinate beam passing through the portion of the tape located at the light aperture 5 will emerge as an image impressed light beam and pass through the objective lens 30, there rotated one hundred and eighty degrees end for end and be projected onto the rear face of the translucent screen 31 to appear in upright readable position on the front face of the screen 31.

The other subordinate light beam passing through the portion of the tape located at the light aperture 8 will there emerge as an image impressed light beam and pass through the objective lens unit 32, be there rotated one hundred and eighty degrees end for end and finally be projected onto the rear face of the translucent screen 33 to appear in an upright readable position on the front face of the screen 33.

The motor 19 with the present embodiment is controlled in the usual way by the electric switch located in the switch box 99.

In the embodiment illustrated in Fig. 4, there are shown four light apertures and the image will ultimately appear on four rear projection screens. With this embodiment, there are provided four vertically extending light apertures disposed adjacent to one another and facing in four different directions, the tape 34 passing from the ticker 35 where it is moving through a substantially horizontal plane to and under the roller or finger 36 of the switch arm 37 mounted in the switch box 38 attached to the side of the extension 39 of the lamp housing 40. From the finger 36, the tape 34 passes over the guide 41 and then around the idler 42 mounted on a vertically extending shaft, finally appearing at the light aperture 43 in a vertically moving plane. From the light aperture 43, the tape passes around the idler 44 to the next succeeding light aperture 45 disposed at an angle of about ninety degrees to the light aperture 43. From the light aperture 45, the tape passes around the idler 46 to the next succeeding light aperture 47 which extends parallel to the light aperture 43 and is disposed at an angle of about ninety degrees to the light aperture 45. From the light aperture 47 in turn the tape passes around the idler 48 to the next succeeding light aperture 49, parallel to the light aperture 45 and then passes around the idler 50 to the forty-five degree angle plate 51 where the tape receives a ninety degree bend and passes downward to and under the idler 52 and then over the tape pulling roller 53 which is drivingly connected to the motor 54 which is controlled by the electric switch in the switch box 38 in the usual way.

The direction of the tape 34 at the ticker relative to the direction at the light aperture forms an angle of about thirty degrees. Furthermore, the tape at the ticker 35 has its printed side facing upwardly and at the first light aperture 43 and all the succeeding light apertures has its printed side facing away from the light apertures, and its characters inverted.

With the present embodiment, as shown in Fig. 4, the light rays are projected from the lamp in the lamp housing 40 to a mirror or deflector at the bottom of the extension housing 39 from which latter deflector, the light rays are directed upwardly in a light beam which strikes a single condensing lens immediately below and adjacent to the four light apertures 43, 45, 47 and 49, and then projects onto four deflectors or mirrors 55, 56, 57 and 58 thereby to be split up into four subordinate light beams. These latter mirrors are each disposed at an angle of about forty-five degrees to their respective light apertures, the mirror 55 projecting its subordinate light beam in a horizontal direction out through the tape portion at the light aperture 43 ultimately to pass through the objective lens unit 59 onto the rear face of the screen 60, the mirror 56, projecting its subordinate light beam in a horizontal direction out through the tape portion at the light aperture 45 ultimately to pass through the objective lens unit 61 onto the rear face of the screen 62, the mirror 57 projecting its subordinate light beam in a horizontal direction out through the tape portion at the light aperture 47 ultimately to pass through the objective lens unit 63 onto the rear face of the screen 64, and the mirror 58 projecting its subordinate light beam in a horizontal direction out through the tape portion at the light aperture 49 ultimately to pass through the objective lens unit 65 onto the rear face of the screen 66.

By means of the arrangement just described, the light rays from a single source of light will be initially collected to form a single light beam thereupon split up into four subordinate light beams, such four subordinate light beams directed in a horizontal direction through four successive portions of a single piece of tape moving through vertical planes, and then through four objective lens units, each rotating its picture one hundred and eighty degrees end for end and finally projecting their pictures onto the rear faces of four screens to appear in upright readable position on the front faces of such screens.

This arrangement lends itself for servicing either four separate offices or four separate inspection areas or else one large inspection area. When the arrangement is used for one large inspection area or room, its value of course would arise when the projecting machine were located in the middle of the room so that the occupants in four widely spaced apart portions of the room may with facility inspect the messages projected on the screens.

The embodiment illustrated in Fig. 5 is substantially identical to that illustrated in Fig. 4, differing mainly in twisting the tape from the ticker so that its printed side faces away from the light apertures with the top of the tape at the bottom so that with a single objective lens unit for each light aperture, the message can be rotated one hundred and eighty degrees end for end and projected onto a front projection screen.

Here too, there are four light apertures, the tape 67 initially moving through a horizontal plane at the ticker 68, then after passing under the roller or finger 69 of the switch arm 70 pivotally mounted in the switch box 71 moving over the helical guide 72 and then around the idler 73 receiving a twist on the way and finally moving in a vertical plane over the idler 73 to the idler 74 across the first light aperture 75.

The tape 67 then receives a bend of ninety degrees passing over to the idler 76 across the light aperture 77. From the idler 76, the tape 67 passes over to the idler 78 across the light aperture 79 parallel to the light aperture 75 and finally passes over to and around the idler 80, across the light aperture 81 parallel to the light aperture 77.

From the idler 80, the tape 67 passes over the angle plate 82 down to the idler 83 finally engaging the tape pulling roller 84. The tape pulling roller 84 is drivingly connected to the motor 85 in the usual way and the conductors of the motor 85 are operatively connected to the switch in the switch box 71 in the usual way.

The light rays passing through the portion of the tape 67 at the light aperture 75 are projected through the objective lens unit 86 onto the front face of the front projection screen 87 being rotated one hundred and eighty degrees end for end by the objective lens unit 86 to appear in an upright readable position on the front face of the screen 87.

Similarly the light rays from the light apertures 77, 79 and 81 are projected through the objective lens units 88, 89 and 90 respectively and by the latter rotated one hundred and eighty degrees end for end finally to appear in upright readable position on the front faces of the front projection screens 91, 92 and 93 respectively.

It is of course obvious that the aforesaid arrangement may be changed to accommodate three, four or more light apertures without departing from the spirit of the invention.

In order to insure properly twisting the tape when changing from its path of movement in a substantially horizontal plane adjacent the ticker to a path of movement in a substantially vertical plane at the first light aperture, there is provided a helical guide member in engagement with which the tape is maintained by a pressure device, the plate 94 and pressure device 95 being provided for the embodiment of Fig. 1, the plate 41 and pressure device 96 being provided for the embodiment of Fig. 4 and the guide plate 72 and pressure device 97 for the embodiment of Fig. 5.

It is obvious that various changes and modifications may be made to the details of construction without departing from the general spirit of the invention as set forth in the appended claims.

I claim:

1. The combination with a lamp, of a plurality of vertically extending light apertures, means for drawing a marked tape successively across said light apertures, means for directing the light rays from said lamp initially in a horizontal direction, a condenser adjacent to and below said light apertures, a deflector for intercepting the initial horizontally directed light rays and deflecting them upwardly through said condenser, and deflectors adjacent to said light apertures and above said condenser for intercepting the light rays directed through said condenser dividing them into subordinate light beams and directing them through said several tape portions disposed at said light apertures.

2. The combination with a lamp, of a plurality of vertically extending light apertures, means for drawing a marked tape successively across said light apertures, means for directing the light rays from said lamp initially in a horizontal direction, a condenser adjacent to and below said light apertures, a deflector for intercepting the initial horizontally directed light rays and deflecting them upwardly through said condenser, deflectors adjacent to said light apertures and above said condenser for intercepting the light rays directed through said condenser dividing them into subordinate light beams and directing them through said several tape portions disposed at said light apertures, and an objective lens unit and a projection screen for each light aperture, the objective lens unit intercepting the image impressed subordinate light beam passing through the light aperture associated therewith, rotating it one hundred and eighty degrees end for end, and projecting it onto the screen associated therewith.

3. The combination with a lamp, of a plurality of vertically extending light apertures, means for drawing a marked tape successively across said light apertures, said marked tape having printed matter thereon reading longitudinally thereof and upside down when crossing said light apertures, means for directing the light rays from said lamp initially in a horizontal direction, a condenser, a deflector intercepting the initial horizontally directed light rays and deflecting them upwardly through said condenser, deflectors above said condenser for intercepting the light rays directed through said condenser dividing them into subordinate light beams and directing them through the several tape portions at the several light apertures, a screen for each light aperture, and an objective lens interposed between each light aperture and its screen for intercepting the image impressed subordinate light beam rotating the same one hundred and eighty degrees end for end and finally projecting it onto the screen associated therewith.

4. The combination with a lamp, of a plurality of vertically extending light apertures spaced from said lamp and disposed at a different level, means for drawing a marked tape successively across said light apertures, means for directing the light rays from said lamp initially in a horizontal direction, a condenser adjacent to said light apertures, a deflector for intercepting the initially horizontally directed light rays and directing them in a vertical direction through said condenser, and deflectors adjacent to said light apertures for intercepting the light rays directed through said condenser dividing them into subordinate light beams and directing them through the several tape portions at the several light apertures.

5. The combination with a lamp, of a plurality of vertically extending light apertures spaced from said lamp and disposed at a different level, means for drawing a marked tape successively across said light apertures, the printed matter on said tape reading longitudinally thereof and disposed upside down when crossing said light apertures, means for directing the light rays from said lamp initially in a horizontal direction, a condenser, a deflector for intercepting the initial horizontally directed light rays and deflecting them vertically through said condenser, secondary deflectors adjacent to said light apertures for intercepting the light rays through said condenser, dividing them into subordinate light beams and deflecting them in a horizontal direction through the several vertically extending tape portions at said light apertures, a screen for each light aperture, and an optical lens unit for each light aperture for intercepting the image impressed subordinate light beam and projecting it onto the screen associated therewith.

6. The combination with a lamp, of a plurality of vertically extending light apertures, means for twisting a marked tape out of its normal horizontal plane into a vertical plane, means for guiding the tape so twisted successively across said light apertures through vertically extending planes, means directing the light rays from said lamp in a vertical direction, a condenser for receiving the light rays so directed in a vertical direction, and deflectors adjacent to said light apertures for intercepting the light rays directed through said condenser, dividing them into subordinate light beams and directing them through the several tape portions at said light apertures.

7. The combination with a lamp, of a plurality of vertically extending light apertures, means for twisting a marked tape out of its normal horizontal plane into a vertical plane, means for guiding the tape so twisted successively across said light apertures through vertically extending planes, the printed matter on said tape reading longitudinally thereof and disposed upside down at said light apertures, means directing the light rays from said lamp in a vertical direction, a condenser for receiving the light rays so directed in a vertical direction, deflectors adjacent to said light apertures for intercepting the light rays directed through said condenser, dividing them into subordinate light beams and directing them through the several tape portions at said light apertures, a screen for each light aperture, and an objective lens unit for each light aperture intercepting the image impressed subordinate light beam rotating it one hundred and eighty degrees end for end and projecting it onto the screen associated therewith.

8. The combination with a lamp, of two parallel vertically extending light apertures, means for drawing a marked tape successively across said light apertures, the printed matter on said tape reading longitudinally thereof and disposed upside down at said light apertures, a condenser, means for directing the light rays from said lamp vertically through said condenser, a deflector for each light aperture disposed at an angle thereto to intercept a portion of the light rays passing through said condenser and directing them through the tape portion disposed at its light aperture, a screen for each light aperture, and an objective lens unit for each light aperture for intercepting the image impressed light rays and projecting them onto the screen associated therewith.

9. The combination with a lamp, of two parallel vertically extending light apertures, means for drawing a marked tape successively across said light apertures, the printed matter on said tape reading longitudinally thereof and disposed upside down at said light apertures, a condenser, means for directing the light rays from said lamp vertically through said condenser, two deflectors disposed between said light apertures and in the path of the light rays passing through said condenser to deflect the same in a horizontal direction through the tape portions at said light apertures in opposite directions, a rear projection screen for each light aperture, and an objective lens unit for each light aperture for intercepting the image impressed light rays rotating the same one hundred and eighty degrees end for end and projecting them onto the rear face of the screen associated therewith.

10. The combination with a lamp, of four adjacent vertically extending light apertures disposed at right angles to one another, means for drawing a market tape successively across said light apertures, the printed matter on said tape reading longitudinally thereof and disposed upside down at said light apertures, a condenser, means for directing the light rays from said lamp in a vertical direction through said condenser, four deflectors disposed inside of said light apertures, a deflector for each light aperture and disposed at an angle thereto to intercept a portion of the light rays passing through said condenser and deflecting them in a horizontal direction to the light aperture associated therewith, a screen for each light aperture, and an objective lens unit for each light aperture for intercepting the image impressed light rays rotating them one hundred and eighty degrees end for end and projecting them onto the screen associated therewith.

11. The combination with a lamp, of four vertically extending light apertures disposed adjacent to one another to form a rectangle, means for drawing a marked tape successively across said light apertures, the printed matter on the tape reading longitudinally thereof and disposed upside down with the printed side facing away from the light apertures, a condenser, means for directing the light rays from said lamp in a vertical direction through said condenser, four deflectors disposed inside of said light apertures, one deflector for each light aperture and inclined thereto to intercept a portion of the light rays passing through said condenser and deflecting them in a horizontal direction outwardly through the tape portion at its light aperture, a rear projection screen for each light aperture, and an objective lens unit for each light aperture intercepting the image impressed light rays rotating them one hundred and eighty degrees end for end and projecting them onto the rear face of the screen associated therewith.

12. The combination with a lamp, of four vertically extending light apertures disposed adjacent to one another to form a rectangle, means for drawing a marked tape successively across said light apertures, the printed matter on the tape reading longitudinally thereof and disposed upside down at said light apertures with the printed side facing toward said light apertures, a condenser, means for directing the light rays from said lamp in a vertical direction through said condenser, four deflectors inside of said light apertures, one deflector for each light aperture and disposed at an angle thereto to intercept a portion of the light rays passing through said condenser and deflect them outwardly through the tape portion disposed at said light aperture, a front projection screen for each light aperture, and an objective lens unit for each light aperture intercepting the image impressed light rays, rotating them one hundred and eighty degrees end for end and projecting them onto the front face of the screen associated therewith in an upright readable position.

13. The combination with a lamp, of a plurality of vertically extending light apertures, means for drawing a marked tape successively across said light apertures, a condenser adjacent to said light apertures and positioned initially to receive the light rays from said lamp, and deflectors adjacent to said light apertures and positioned relative to said condenser for intercepting the light rays directed through said condenser dividing them into subordinate light beams and thereupon directing them through said several tape portions disposed at said light apertures.

14. The combination with a lamp, of a plurality of vertically extending light apertures, means for drawing a marked tape successively across said light apertures, a condenser adjacent to said light apertures and positioned initially to receive the light rays from said lamp, deflectors adjacent to said light apertures and positioned relative to said condenser for intercepting the light rays directed through said condenser dividing them into subordinate light beams and thereupon directing them through said several tape portions disposed at said light apertures, and an objective lens unit and a projection screen for each light aperture, the objective lens unit intercepting the image impressed subordinate light beam passing through the light aperture associated therewith, rotating it one hundred and eighty degrees end for end, and projecting it onto the screen associated therewith.

15. The combination with a lamp, of a plurality of vertically extending light apertures, means for drawing a marked tape successively across said light apertures, said marked tape having printed matter thereon reading longitudinally thereof and upside down when crossing said light apertures, a condenser positioned initially to receive the light rays from said lamp, deflectors positioned relative to said condenser for intercepting the light rays directed through said condenser dividing them into subordinate light beams and thereupon directing them through the several tape portions at the several light apertures, a screen for each light aperture, and an objective lens interposed between each light aperture and its screen for intercepting an image impressed subordinate light beam rotating the same one hundred and eighty degrees end for end and finally projecting it onto the screen associated therewith.

16. The combination with a lamp, of a plurality of vertically extending light apertures, means for twisting a marked tape out of its normal horizontal plane into a vertical plane, means for guiding the tape so twisted successively across said light apertures through vertically extending planes, a condenser positioned for initially receiving the light rays from said lamp, and deflectors adjacent to said light apertures for intercepting the light rays directed through said condenser, dividing them into subordinate light beams and thereupon directing them through the several tape portions at said light apertures.

17. The combination with a lamp, of a plurality of light apertures extending vertically to a single plane, means for drawing a marked tape successively across said light apertures, a condenser adjacent to said light apertures and positioned initially to receive the light rays from said lamp and direct them toward said light apertures but parallel to said light apertures, and deflectors inclined to said light apertures and to said condenser for intercepting the light rays directed through said condenser, dividing them into subordinate light beams and thereupon directing them through the tape at the several light apertures.

18. The combination with a lamp, of a plurality of light apertures extending vertically to a single plane, means for drawing a marked tape successively across said light apertures, a condenser adjacent to said light apertures and positioned initially to receive the light rays from said lamp and direct them toward said light apertures but parallel to said light apertures, deflectors inclined to said light apertures and to said condenser for intercepting the light rays directed through said condenser, dividing them into subordinate light beams and thereupon directing them through the tape at the several light apertures, and an objective lens unit and a projection screen for each light aperture, the objective lens unit intercepting the image impressed subordinate light beam passing through the light aperture associated therewith, rotating it one hundred and eighty degrees end for end and projecting it onto the screen associated therewith.

19. The combination with a lamp, of a plurality of light apertures extending vertically to a single plane, means for drawing a marked tape successively across said light apertures, said marked tape having printed matter thereon reading longitudinally thereof and upside down when crossing said light apertures, a condenser positioned initially to receive the light rays from said lamp and direct them toward said light apertures and parallel to said light apertures, deflectors inclined to said light apertures and to said condenser for intercepting the light rays directed through said condenser, dividing them into subordinate light beams and thereupon directing them through the tape at the several light apertures, a screen for each light aperture, and an objective lens interposed between each light aperture and its screen for intercepting an image impressed subordinate light beam rotating the same one hundred and eighty degrees end for end and finally projecting it onto the screen associated therewith.

20. The combination with a lamp, of a plurality of light apertures extending vertically to a single plane, means for twisting a marked tape out of its normal horizontal plane into a vertical plane, means for guiding the tape so twisted successively across said light apertures through vertically extending planes, a condenser adjacent to said light apertures and positioned initially to receive the light rays from said lamp and direct them toward said light apertures but parallel to said light apertures, and deflectors inclined to said light apertures and to said condenser for intercepting the light rays directed through said condenser, dividing them into subordinate light beams and thereupon directing them through the tape at the several light apertures.

21. The combination with a lamp, of a plurality of light apertures extending vertically to a single plane and forming an enclosed polygon, means for directing light rays from said lamp toward said light apertures but parallel to said light apertures, deflectors positioned inside of and adjacent to said light apertures and inclined to said light apertures to intercept the light rays directed by said light directing means, dividing them into subordinate light beams and thereupon directing them outwardly through said several light apertures, and means for drawing a marked tape successively across said light apertures.

22. The combination with a lamp, of a plurality of light apertures extending vertically to a single plane and forming an enclosed polygon, means for directing light rays from said lamp toward said light apertures but parallel to said light apertures, deflectors positioned inside of and adjacent to said light apertures and inclined to said light apertures to intercept the light rays directed by said light directing means, dividing them into subordinate light beams and thereupon directing them outwardly through said several light apertures, means for drawing a marked tape successively across said light apertures, and an objective lens unit and a projection screen for each light aperture, the objective lens unit intercepting the image impressed subordinate light beam passing through the light aperture associated therewith, rotating it one hundred and eighty degrees end for end, and projecting it onto the screen associated therewith.

23. The combination with a lamp, of a plurality of light apertures extending vertically to a single plane and forming an enclosed polygon, means for directing light rays from said lamp toward said light apertures but parallel to said light apertures, deflectors positioned inside of and adjacent to said light apertures and inclined to said light apertures to intercept the light rays directed by said light directing means, dividing them into subordinate light beams and thereupon directing them outwardly through said several light apertures, means for drawing a marked tape successively across said light apertures, a screen for each light aperture, and an objective lens interposed between each light aperture and its screen for intercepting an image impressed subordinate light beam rotating the same one hundred and eighty degrees end for end and finally projecting it onto the screen associated therewith.

24. The combination with a lamp, of a plurality of light apertures extending vertically to a single plane and forming an enclosed polygon, means for twisting a marked tape out of its normal horizontal plane into a vertical plane, means for guiding the tape so twisted successively across said light apertures through vertically extending planes, means for directing light rays from said lamp toward said light apertures but parallel to said light apertures, and deflectors positioned inside of and adjacent to said light apertures and inclined to said light apertures to intercept the light rays directed by said light directing means, dividing them into subordinate light beams and thereupon directing them outwardly through the tape at said several light apertures.

25. The combination with a lamp, of a plurality of light apertures extending vertically to a single plane and forming an enclosed polygon, means for directing light rays from said lamp toward said light apertures but parallel to said light apertures, deflectors positioned inside of and adjacent to said light apertures and inclined to said light apertures to intercept the light rays directed by said light directing means, dividing them into subordinate light beams and thereupon directing them outwardly through said several light apertures, means for drawing a marked tape successively across said light apertures, and means for guiding a marked tape successively across said light apertures and thereupon downwardly out of the path of the light rays directed through said light apertures.

26. The combination with a lamp, of a plurality of light apertures extending vertically to a single plane and forming an enclosed polygon, means for directing light rays from said lamp toward said light apertures but parallel to the same, deflectors positioned inside of and adjacent to said light apertures and inclined to said light apertures to intercept the light rays directed by said light directing means, dividing them into subordinate light beams and thereupon directing them outwardly through said several light apertures, and an objective lens unit and a projection screen for each light aperture, the objective lens units being disposed outside of said polygon and to one side of said single plane, and means for guiding a marked tape clear of the path of the light rays, then across said light apertures, and thereupon again clear of the path of the light rays, each objective lens unit intercepting the image impressed subordinate light beam passing through the light aperture associated therewith rotating it one hundred and eighty degrees end for end and projecting it onto the screen associated therewith.

27. The combination with a lamp, of a plurality of light apertures extending vertically to a single plane and forming an enclosed polygon, means for guiding a marked tape clear of the path of the light rays, then successively across said several light apertures and thereupon again clear of the path of the light rays, said marked tape having printed matter thereon reading longitudinally thereof and upside down when crossing said light apertures, a condenser positioned initially to receive the light rays from said lamp, deflectors positioned relative to said condenser for intercepting the light rays directed through said condenser, dividing them into subordinate light beams and thereupon directing them through the tape at the several light apertures, a screen for each light aperture, and an objective lens unit interposed between each light aperture and its screen for intercepting an image impressed subordinate light beam, rotating the same one hundred and eighty degrees end for end and finally projecting it onto the screen associated therewith.

AUGUST D. EITZEN.